May 14, 1957 — S. WARREN — 2,791,843
FLASH RECOGNITION TRAINING DEVICE
Filed March 23, 1954
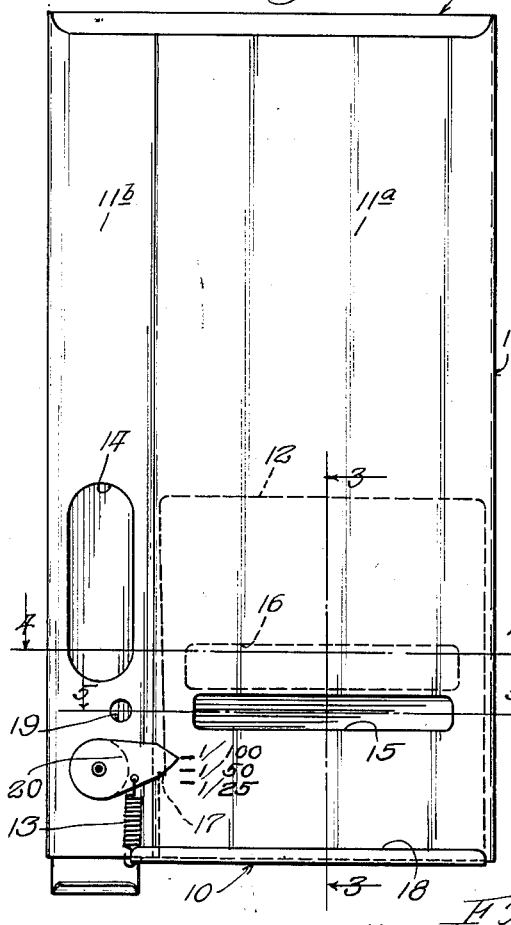
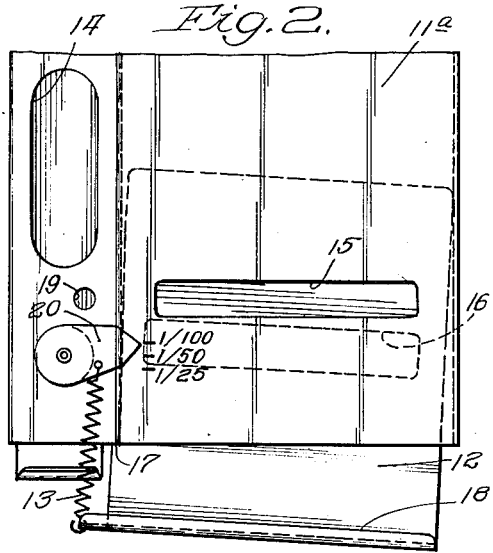
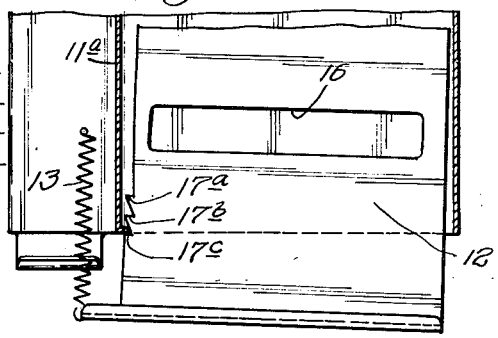
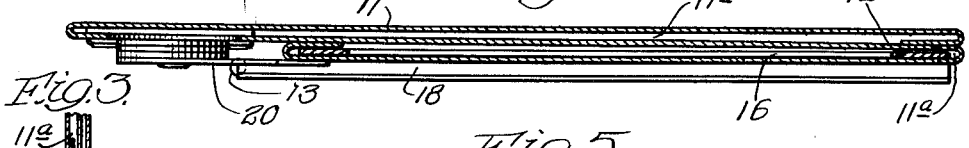
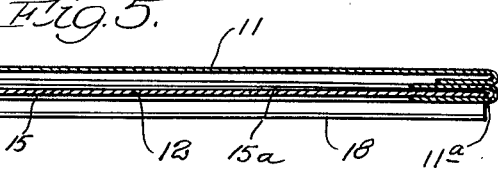
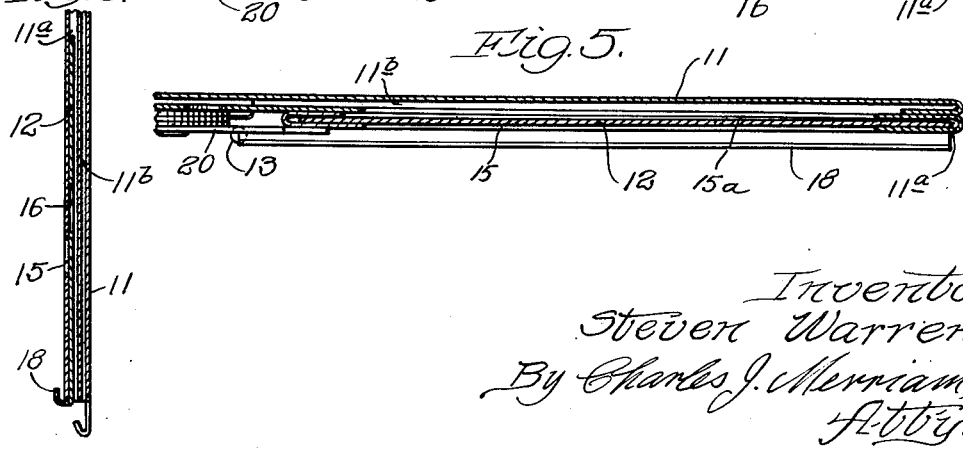
Inventor:
Steven Warren,
By Charles J. Merriam,
Atty.

United States Patent Office 2,791,843
Patented May 14, 1957

2,791,843

FLASH RECOGNITION TRAINING DEVICE

Steven Warren, Chicago, Ill.

Application March 23, 1954, Serial No. 418,109

2 Claims. (Cl. 35—35)

This invention relates to a flash recognition training device, and particularly to a device of this kind that is hand operated.

Flash recognition training devices of various types have been very helpful in improving the speed with which an observer can recognize symbols such as words, phrases, numbers, pictures, etc. Such devices have been used, for instance, to improve the speed of recognition of aircraft silhouettes by persons assigned to observe the movement of such craft.

An important current use of flash recognition training devices is in developing improved reading skill on the part of both children and adults. For this purpose, especially in the training of individuals separately rather than in groups, the device is most useful if hand operated and conveniently portable.

Although the reader is ordinarily unaware of it, the process of reading requires a continuous series of mechanical movements of the muscles of the eye, coordinated with a process of perception by the eye and nervous system of the observer. It is well known that these mechanical eye movements and the accompanying perception process can be speeded up by means of various training techniques. Flash recognition training devices play an important part in these techniques.

These devices present to the trainee a symbol, such as a word or number, which he is required to recognize in a fraction of a second before the symbol is removed from his view. An existing portable flash recognition training device is comprised of a mask to be placed over practice reading matter, the mask having a sighting aperture through which to observe the reading matter when it is momentarily exposed; a shutter with a corresponding opening; and means for placing the shutter under a linear spring tension. In operation, the shutter is placed under spring tension by the user of the device by means of his pulling manually upon a hand piece extending from the shutter. The amount of tension is controlled by the user through the amount of manual pull which he exerts on the shutter. If he wishes to expose the symbol to be read for a given fraction of a second, he pulls the hand piece to a certain point. If he wishes to expose the symbol for a shorter length of time, he pulls the hand piece still farther so that the spring tension on the shutter is greater.

In use, this flash recognition training device is laid over the reading matter which is being used for training purposes. The symbol to be read is exposed to the trainee for whatever length of time the sighting aperture in the mask and the corresponding opening in the moving shutter are aligned so as to leave a sufficiently large opening for the symbol to be visible. The greater the spring tension placed on the shutter, the faster is the shutter's movement back to its rest position, and so the shorter the length of time the two openings are aligned in position to permit the symbol to be seen.

This prior device has several disadvantages. The area of the mask must of necessity be less than the area of the sheet on which the reading matter is contained, as the trainee must keep the mask and reading sheet in proper relative position by pressing the mask down upon the sheet and if the sheet were smaller than the mask it might not be held securely under this pressure. Because of this maximum limitation on the area of the mask, the reading matter used for training is often exposed and seen ahead of time, whether deliberately or inadvertently. This of course reduces the value of the flash recognition exercise. It is also difficult to hold the mask in place on the reading sheet because pressure needs to be exerted by the fingers down upon the flash recognition training device as it lies upon the table or other support upon which it is placed for use.

Furthermore, it is difficult and inconvenient for the user of the device to keep the line of sight from his eye at right angles to the training device, so long as it must be placed flat upon a surface such as a table. If a slanting surface is used in order to put the reading matter at right angles to the line of sight, this increases the difficulty of keeping the training device securely positioned over the reading sheet.

Finally, the user of such a device is unable to give the symbols to be read his undivided attention, since he has to give some attention to the tension he places upon the hand piece of the shutter in order to control the shutter speed, and this requires him at least to glance out of the corner of his eye at the shutter speed indicator at the same time that he should be looking directly at the symbol to be recognized. In addition to looking two places at once, the user must give some thought to holding the shutter hand piece stationary at the correct point to produce the desired shutter speed.

The flash recognition training device of my invention avoids all these disadvantages. It provides complete masking of the reading matter until exposed as desired. There is no difficulty in holding the masking means and the reading matter in the proper position with respect to the reader's eye, or in keeping the reading matter and masking means in proper relative position. The device is entirely portable, and so if desired may be held by hand at any angle required. The user need neither look at, nor give thought to, anything other than the material to be read.

The flash recognition training device of this invention includes masking means having a sighting aperture, a shutter which moves with respect to the masking means and has an opening which may be aligned with the sighting aperture of the masking means, tensioning means adapted to urge the shutter back into its rest position whenever it is displaced from that position, and cocking means which holds the shutter in a cocked condition without any attention from the trainee and permits the shutter to be released from its cocked condition upon a very slight manual pressure on the part of the trainee.

In the drawing:

Figure 1 is a plan view of one embodiment of this invention;

Figure 2 is a fragmentary plan view of the same embodiment showing the shutter in one position within the masking means;

Figure 3 is a fragmentary sectional view along line 3—3 of Figure 1;

Figure 4 is a sectional view taken along line 4—4 of Figure 1;

Figure 5 is a sectional view taken along line 5—5 of Figure 1; and

Figure 6 is a fragmentary view partially in section of a second embodiment of the invention.

In Figure 1 flash recognition training device 10 includes masking means 11, shutter 12 and elastic tensioning means 13. Elements 11 and 12 are preferably made of plastic or other material which is stiff but light in weight.

Masking means 11 is made up of two flat sleeves 11a and 11b, which are best seen in section in Figure 4. In the embodiment shown, the two sleeves are conveniently fabricated by making four folds in the sheet of which masking means 11 is made, starting at the left side of sleeve 11a and finishing at the right side of sleeve 11b. As seen from Figure 4, sleeves 11a and 11b are then comprised of a front panel, an intermediate panel spaced therefrom, and a rear panel spaced from the intermediate panel on the opposite side from the front panel. The intermediate panel is seen to be common to both sleeves.

Shutter 12 slides in sleeve 11a. Sleeve 11b is adapted to contain a viewing card or sheet which carries symbols of various sorts which are specially chosen for use in flash recognition training exercises. It is seen that sleeve 11b will keep the viewing card or sheet entirely hidden from the observer's view until parts of it are selected by him to be exposed.

Sleeve 11b has control slot 14 at one side. One edge of the card or viewing sheet which is slidably engaged in sleeve 11b will show through slot 14 so long as the card or sheet is in viewing position. Pressing on this part of the card or sheet which is exposed through slot 14, the user of the device may manually push the card or sheet along through sleeve 11b as successive symbols have been used in the flash recognition training exercise.

Masking means 11 has sighting aperture 15 disposed near the bottom of the front panel of the device. Sighting aperture 15a, best seen in Figure 5, is provided in the intermediate panel in alignment with aperture 15. Shutter 12 has a similar opening 16, which is preferably somewhat wider in the direction of shutter movement than is aperture 15. Opening 16 is adapted for alignment with apertures 15 and 15a when the shutter is displaced a certain distance from its rest position.

Shutter 12 has a notch 17 on one side of the shutter. The notch is adapted to engage one edge of sleeve 11a, or other stop means carried by said sleeve, when shutter 12 is pulled away from its rest position by means of the hooked end 18. As the shutter is pulled into its cocked position by this engagement of notch 17, elastic tensioning means 13 is extended as shown in Figure 2.

Figure 2 also indicates the relative position of sighting aperture 15 and shutter opening 16 when the shutter is in its cocked condition. It is seen that the viewing card or sheet used with the flash recognition training device is entirely hidden from view when the device is in cocked condition.

At such time the user may look through numbering opening 19 to see a number which corresponds to the symbol contained on the viewing card or sheet which is positioned beneath sighting apertures 15 and 15a at the moment. If this particular symbol has already been used in a flash recognition training exercise, the user may push the viewing card or sheet down through control slot 14 until the next number shows through opening 19, when the device is then in condition for use.

In use, the trainee holds the device in any comfortable position so that viewing aperture 15 is in plain view. He directs his line of sight and all his attention to sighting aperture 15, where the symbol to be viewed will be momentarily exposed. He presses with a very slight manual pressure on shutter 12, pushing it to the right so that notch 17 slips out of engagement with sleeve 11a. Spring 13 causes shutter 12 to snap back into its rest position. As this happens, there is a moment when sighting apertures 15, 15a and shutter opening 16 are in sufficient alignment that the trainee has a clear view of the symbol he is seeking to recognize.

The speed with which the trainee learns to recognize symbols thus momentarily exposed affects his rate of reading, especially if the symbols are of the kind which he will be likely to run across in the kind of reading he will be doing.

The period of time the viewing aperture and shutter opening will be in sufficient alignment for the symbol on the viewing card or sheet to be seen by the trainee is inversely proportional to the tension placed on shutter 12 by spring 13 which urges the shutter to move from its cocked condition into its rest position. In the embodiment of Figures 1 and 2, this tension is varied by moving pointer 20 so that it points at the fractional figures shown on sleeve 11a, which represent the various shutter speeds of the device. One end of spring 13 is attached to the shutter, and the other end is attached to pointer 20.

In the embodiment of this invention shown in Figure 6, the end of spring 13 which is not attached to the shutter is secured fixedly to sleeve 11b. Variations in shutter speed are then achieved by selecting notch 17a, 17b or 17c for engagement with the edge of sleeve 11a when the shutter is placed in its cocked condition. The edge of sleeve 11a is preferably bent in slightly as shown in Figure 6, to provide a stop against which the notch selected may be releasably engaged as explained.

Further details of the construction of this device are shown in Figures 3 through 5. In Figure 3 shutter 12 is shown in its rest position, in which sighting aperture 15 is blocked by the shutter because shutter opening 16 is out of alignment therewith. As shown, shutter 12 is slidably engaged in sleeve 11a. Sleeve 11b provides a channel in which the viewing card or sheet is placed for slidable engagement as above described.

In Figure 4, sleeve 11a is shown as superimposed on sleeve 11b; shutter 12 is again in its rest position, with shutter opening 16 out of alignment with sighting apertures 15 and 15a. Pointer 20 is seen at the left of Figure 4, with spring 13 attached thereto.

Figure 5 is another cross sectional view of the device of this invention, showing how shutter 12 is slidably engaged in sleeve 11a and how sleeve 11b is adapted for providing a channel in which the viewing card or sheet is slidaly engaged.

The foregoing detailed description has been given for clearness of understanding only. No unnecessary limitation should be understood therefrom, as modifications will be obvious to those skilled in the art.

I claim:

1. A flash recognition training device for use with a viewing sheet containing symbols for recognition by the trainee which comprises: a front panel having a sighting aperture; an intermediate panel spaced from the front panel, said intermediate panel having a sighting aperture aligned with the aperture of the front panel, said front and intermediate panels forming a channel adapted to receive a shutter; stop means carried by one of said panels; a rear panel spaced from the intermediate panel on the opposite side from said front panel, said intermediate and rear panels forming a channel adapted to receive said viewing sheet; a shutter adapted for movement relative to the front and intermediate panels in the channel formed by said panels, said shutter having an opening for alignment with said sighting apertures when the shutter is in a position other than its rest position, said opening being so positioned that the sighting apertures will be entirely blocked when the shutter is in said rest position, said shutter having a notch in its side, said notch being adapted to be engaged with said stop means upon a slight movement of the shutter in a direction transverse to the direction in which the shutter moves in its channel and to be disengaged by a slight movement in the opposite transverse direction, said shutter further having an end adapted to extend beyond said front and intermediate panels in the direction in which the shutter moves from its rest position toward the position in which its notch is engaged with said stop, said shutter end being bent to bar movement of the shutter beyond its rest position when said notch is disengaged from said stop; and a tension spring having one end secured to said shutter and the other to one of said panels to apply tension to the shutter urging it into its rest position whenever it is displaced therefrom.

2. A flash recognition training device for use with a viewing sheet containing symbols for recognition by the trainee which comprises: a front panel having a sighting aperture; an intermediate panel spaced from the front panel, said intermediate panel having a sighting aperture aligned with the aperture of the front panel, said front and intermediate panels forming a channel adapted to receive a shutter; a stop carried by one of said panels; a rear panel spaced from the intermediate panel on the opposite side from said front panel, said intermediate and rear panels forming a channel adapted to receive said viewing sheet, said intermediate panel having an index aperture through which numbers located on the viewing sheet opposite the symbols to be viewed may be seen and also having a control slot for manual movement of said viewing sheet by the operator; a shutter adapted for movement relative to the front and intermediate panels in the channel formed by said panels, said shutter having an opening for alignment with said sighting apertures when the shutter is in a position other than its rest position, said opening being so positioned that the sighting apertures will be entirely blocked when the shutter is in said rest position, said shutter having a notch in its side, said notch being adapted to be engaged with said stop means upon a slight movement of the shutter in a direction transverse to the direction in which the shutter moves in its channel and to be disengaged by a slight movement in the opposite transverse direction, said shutter further having an end adapted to extend beyond said front and intermediate panels in the direction in which the shutter moves from its rest position toward the position in which its notch is engaged with said stop, said shutter end being bent to bar movement of the shutter beyond its rest position when said notch is disengaged from said stop; and a tension spring having one end secured to said shutter and the other to one of said panels to apply tension to the shutter urging it into its rest position whenever it is displaced therefrom.

References Cited in the file of this patent
UNITED STATES PATENTS

| | | |
|---|---|---|
| 319,663 | Barker | June 9, 1885 |
| 348,301 | Tisdel | Aug. 31, 1886 |
| 359,797 | Lewis | Mar. 22, 1887 |
| 372,857 | Lewis | Nov. 8, 1887 |
| 1,231,878 | Grenell | July 3, 1917 |
| 2,395,194 | Ringer | Feb. 19, 1946 |
| 2,647,329 | Bloch et al. | Aug. 4, 1953 |
| 2,723,466 | Ott | Nov. 15, 1955 |